United States Patent [19]
Andrews et al.

[11] Patent Number: 6,160,503
[45] Date of Patent: Dec. 12, 2000

[54] DEBLOCKING FILTER FOR ENCODER/DECODER ARRANGEMENT AND METHOD WITH DIVERGENCE REDUCTION

[75] Inventors: Barry D. Andrews, Palo Alto; Stephane Bryant; May Shu-Pei Chiang, both of San Jose; Ruili Hu, Cupertino; Katherine Kwan, San Jose; Paul Ning, Foster City; Paul A. Voois, Sunnyvale; Bryan R. Martin, Campbell, all of Calif.

[73] Assignee: 8×8, Inc., Santa Clara, Calif.

[21] Appl. No.: 09/112,612

[22] Filed: Jul. 9, 1998

Related U.S. Application Data

[63] Continuation-in-part of application No. 09/064,397, Apr. 22, 1998, which is a continuation-in-part of application No. 09/098,106, Jun. 16, 1998, which is a continuation of application No. 09/005,053, Jan. 9, 1998, which is a continuation-in-part of application No. 08/908,826, Aug. 8, 1997, Pat. No. 5,790,712, which is a continuation of application No. 08/658,917, May 31, 1996, abandoned, which is a continuation of application No. 08/303,973, Sep. 9, 1994, abandoned, which is a continuation of application No. 07/838,382, Feb. 19, 1992, Pat. No. 5,379,351.

[51] Int. Cl.[7] .................................................. H03M 13/00
[52] U.S. Cl. ................................................................ 341/94
[58] Field of Search ............................... 341/94; 348/405, 348/409, 404, 415

[56] References Cited

U.S. PATENT DOCUMENTS

| | | |
|---|---|---|
| 5,604,502 | 2/1997 | Haskell et al. . |
| 5,635,938 | 6/1997 | Komoto . |
| 5,715,004 | 2/1998 | Chun et al. .............................. 348/403 |
| 5,736,944 | 4/1998 | Kurihara . |
| 5,872,866 | 2/1999 | Strongin et al. . |

OTHER PUBLICATIONS

ITU–T H.263 Annex J. and full "Draft Text of Recommendation H–263 Version 2 ("H.263+") For Decision".

Document Q15–D–61 from ITU–Study Group 16: "Solution Proposals for the H.263 IDCT Mis–Match Problem with Deblocking Filter Mode (Annex J) Described in Q15–D–41" (Proposal).

*Primary Examiner*—Brian Young
*Attorney, Agent, or Firm*—Crawford PLLC

[57] ABSTRACT

According to one aspect of the disclosure, the present invention provides methods and arrangements for the removal or reduction of divergence artifacts between a transmitting codec and a receiving codec. One of a number of implementations includes using a deblocking filter in an inverse transformer loop and selectively disabling the filter upon certain conditions.

13 Claims, 14 Drawing Sheets

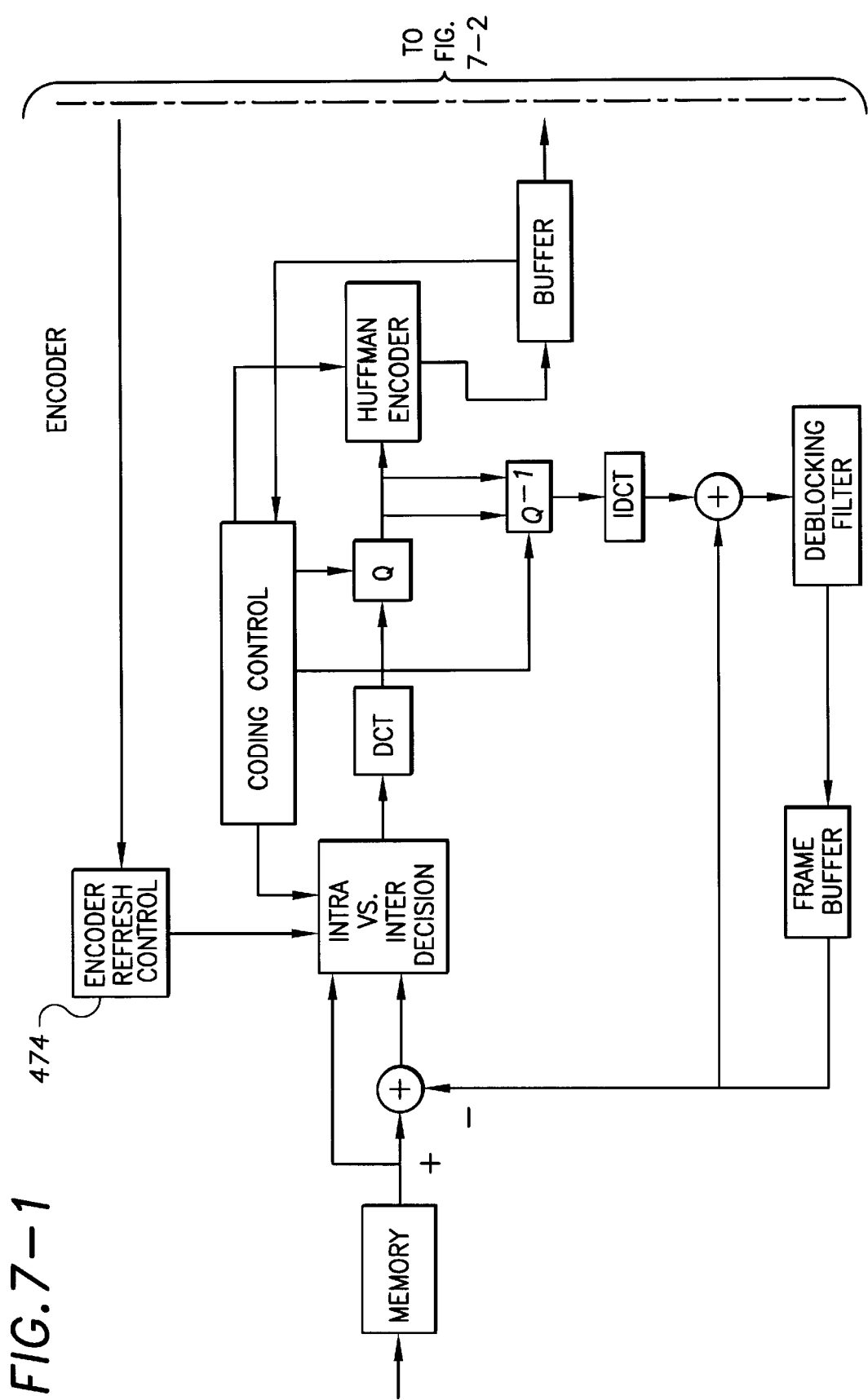

$d1 = UpDownRamp(d, Strength)$

Where $UpDownRamp(x, Strength) = Sign(x)*(MAX(o, 2*(abs(x) - Strength)$ $d1 = ModifiedRamp(d, Strength)$ Where $ModifiedRamp(x, Strength) = Sign(x) * MIN(abs(x), Strength)$

DEBLOCKING FILTER FOR ENCODER/DECODER ARRANGEMENT AND METHOD WITH DIVERGENCE REDUCTION

RELATED APPLICATIONS

This is a continuation-in-part of U.S. patent application Ser. No. 09/064,397, filed on Apr. 22, 1998 (Docket No. 8X8S.208PA) which is a continuation-in part of U.S. patent application Ser. No. 09/098,106, filed Jun. 16, 1998, which is a continuation of U.S. patent application Ser. No. 09/005, 053, filed Jan. 9, 1998, which is a continuation-in-part of U.S. patent application 08/908,826, filed on Aug. 8, 1997 (now U.S. Pat. No. 5,790,712), which is a continuation of U.S. patent application Ser. No. 08/658,917, filed on May 31, 1996 (now abandoned), which is a continuation of U.S. patent application Ser. No. 08/303,973, filed Sep. 9, 1994 (now abandoned), which is a continuation of U.S. patent application Ser. No. 07/838,382, filed Feb. 19, 1992, now U.S. Pat. No. 5,379,351.

FIELD OF THE INVENTION

The present invention relates to data compression and decompression in an encoding/decoding system. The present invention has particular application for image coding/decoding systems where communicating terminals employ reconstruction algorithms based on previously decoded images.

BACKGROUND OF THE INVENTION

Videocommunication equipment, such as videoconferencing systems and videophone devices, have enabled people to communicate visually without having to travel to a common location. As a result, communication participants can be separated by large distances.

A typical videoconferencing uses a video camera to capture a series of images of a target, such as a meeting participant or a document. The series of images is encoded as a data stream and transmitted over a communications channel to a remote location. For example, the data stream may be transmitted over a phone line, an integrated services digital network (ISDN) line, or the Internet. The encoding process is typically implemented using a digital video coder/decoder (codec), which divides the images into blocks and compresses the blocks according to a video compression standard, such as the H.263 and H.261 recommendations by the Telecommunication Standardization Sector of the International Telecommunication Union (ITU-T). In standards of this type, a block may be compressed independent of the previous image or as a difference between the block and part of the previous image.

In a typical videoconferencing system, the data stream is received at a remote location, where it is decoded into a series of images, which may be viewed at the remote location. Depending on the equipment used, this process typically occurs at a rate of one to thirty frames per second.

In some videoconferencing applications, it is desirable to transmit a high quality still image. Until the image is completely received and decoded, the receiving terminal is often unaware of its content. Some decoders decode and display a block only after they have received the complete image. With the image being transmitted as a series of blocks, considerable delay is often involved in transmitting the entire image. For example, in applications where the available bandwidth for transmitting data is small, transmission of a 352×288 pixel image may require up to a minute. In order to transmit still images more quickly, the image may be highly compressed.

The above-mentioned Telecommunication Standardization Sector recently revised ITU-T H.263 recommendation by appending thereto Annex J: Deblocking Filter Mode. This annex describes an optional loop filter (also referred to as as block edge filter or deblocking filter) to be used within the prediction loop used for coding in each of the send and receive terminals in image communicating system. The main purpose of the loop filter is to reduce blocking artifacts. Such artifacts often appear at boundaries between different image blocks. The above-mentioned annex, not unlike other recommendations by the ITU, was adopted after much research and consideration for the purpose of providing communicating image terminals of various types and manufacturers the ability to communicate images accurately.

In connection with the present invention, a significant discovery has been made. After intense research, it has been discovered that respective implementations of two image communication terminals, each fully compliant with the above-mentioned annex to the ITU-T H.263 recommendation result in visually apparent artifacts which result from divergence between sending and receiving terminals. Such artifacts appear as long as the loop filter portion of Annex J is used, irrespective of whether the other portions of Annex J (Unrestricted Motion Vectors, 4MV) are also used. The response by the ITU-T was one of surprise.

SUMMARY OF THE INVENTION

Generally, the present invention provides methods and arrangements for the removal or reduction of divergence artifacts between the transmitting codec and the receiving code. In one general embodiment of the invention, a method for transmitting a representation of an image from a first terminal to a second terminal uses a communications channel on which communication has been established between the first terminal and the second terminal. The method operates each of the first and second terminals using an inverse transformer loop having a decoding algorithm that accumulates at least one error, and selectively uses a loop filter in the inverse transformer loop based on at least one predetermined condition. In a more specific embodiment, the predetermined condition includes at least one of: surpassing a quantization parameter threshold; and processing chroma channel data.

In another method embodiment, the present invention provides a method for encoding and decoding a representation of an image for communication between a first terminal to a second terminal. The method comprises: operating each of the first and second terminals using an inverse transformer loop having a decoding algorithm; and preventing unacceptable accumulation of an error within the inverse transformer loop by at least one of: pre-processing input data before using the inverse transformer loop to process the input data; using the inverse transformer in the loop according to a bit-exact specification between the encoder and decoder in the resepctive first and second terminals; using the inverse transformer in the loop according to one of a plurality of bit-exact specifications between the encoder and decoder in the respective first and second terminals and negotiating a common decision on the particular specification through encoder/decoder negotiation; providing a quantization value in the inverse transformer loop that takes into account that the effect of the quantization values on loop filter divergence so as to be less prone to divergence; adjusting or providing transform coefficients to limit divergence; choosing an encoding mode for macro-blocks of input data; modifying the encoder to refresh portions of the image that are diverging; modify the loop filter characteristics so that inverse transform mismatches are not amplified; applying the loop filter to input data corresponding to a frame buffer image just before sending to a display circuit without writing back the results to a frame buffer in the loop.

Certain other aspects of the invention are directed to encoding and decoding equipment and circuits constructed and arranged to operate according to the above methodology.

The above summary is not intended to characterize each embodiment of the present invention. Other aspects of the present invention will become apparent upon review of the figures and corresponding "Detailed Description".

BRIEF DESCRIPTION OF THE DRAWINGS

Various aspects and advantages of the present invention will become apparent upon reading the following detailed description of various embodiments and upon reference to the drawings in which.

Figure 1:
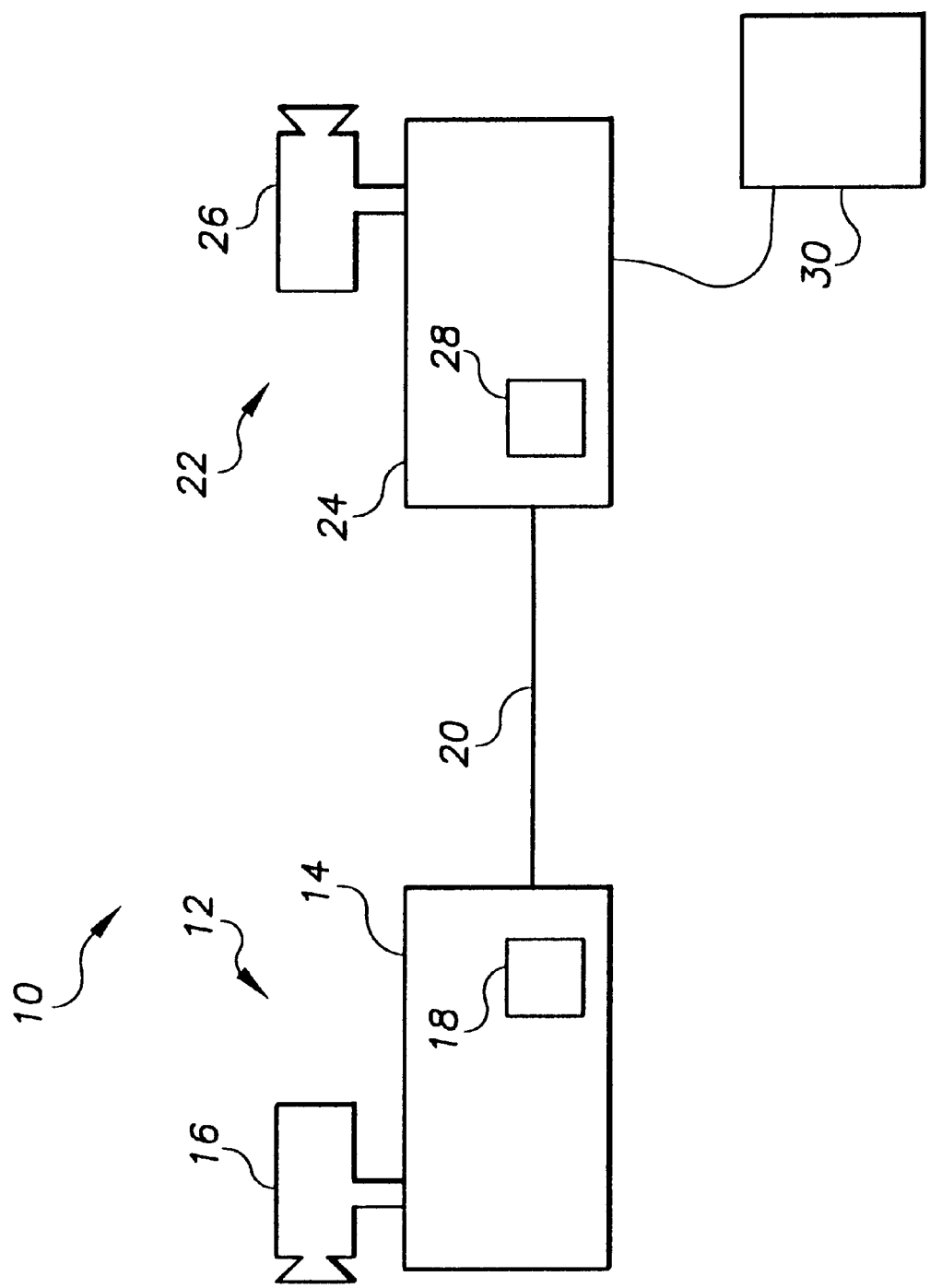
FIG. 1 illustrates a videoconferencing system implementing an embodiment of the present invention.

While the invention is amenable to various modifications and alternative forms, specifics thereof have been shown by way of example in the drawings and will be described in detail. It should be understood, however, that the intention is not to limit the invention to the particular embodiment described. On the contrary, the invention is to cover all modifications, equivalents, and alternatives falling within the spirit and scope of the invention as defined by the appended claims.

DETAILED DESCRIPTION

The present invention is believed to be applicable to a variety of systems and arrangements that transmit and decode compressed images. The present invention has been found to be particularly advantageous in videoconferencing applications in which the reconstruction algorithms of the compressor encoder and compressor decoder are not identical. A particular example application is an application intending to be compliant with the ITU-T H.263 Annex J recommendation where the accuracy of the prediction operation at the communicating terminals is defined using statistical data, rather than a bit-exact or operation-specific methodology at both ends. While the present invention is not necessarily limited to such applications, an appreciation of various aspects of the invention is best gained through a discussion of example arrangements operating in this type of application.

In connection with the present invention, it has been discovered that the nature of the ITU-TH.263 Annex J recommendation permits the accumulation of seemingly negligible differences between transmitting codec's prediction frames and the receiving codec's prediction frames, therefore resulting in significant distortion of the receiving codec's decoded images. This occurs even though mismatched inverse transformations, in this case IDCTs, are compliant according to ITU-T H.263 Annex A ("Inverse Transform Accuracy Specification").

The problem can be best understood by referring to an example image-communication system, such as the videoconferencing system 10 of FIG. 1 and the other illustrated encoding and decoding arrangements.

FIG. 1 illustrates an example videoconferencing system 10 particularly suited for use in connection with the present invention. A first videoconferencing station 12 includes a first terminal 14 that receives images from a camera 16. The images are processed by a codec in the terminal 14 and are transmitted over a communications channel 20. For example, the images may be transmitted over a telephone line, an ISDN line, an Internet channel, or a similar communications network. The images are then received by a second videoconferencing station 22, including a second terminal configured to be compatible with the first terminal. To facilitate the discussion below, the first and second terminals 14 and 24 are respectively referred to as local and remote terminals. It should be understood, however, that the features described can be incorporated into either or both terminals. The remote videoconferencing station 22 may further include a camera 26 and a codec 28. The remote videoconferencing station 22 receives the images over the communications channel 20 from the local videoconferencing station 12 and decodes them using the codec 28. The decoded images may be displayed on a display monitor 30. In this manner, meetings can be conducted, for example, with participants separated by long distances with all meeting participants able to see each other.

Figure 2:
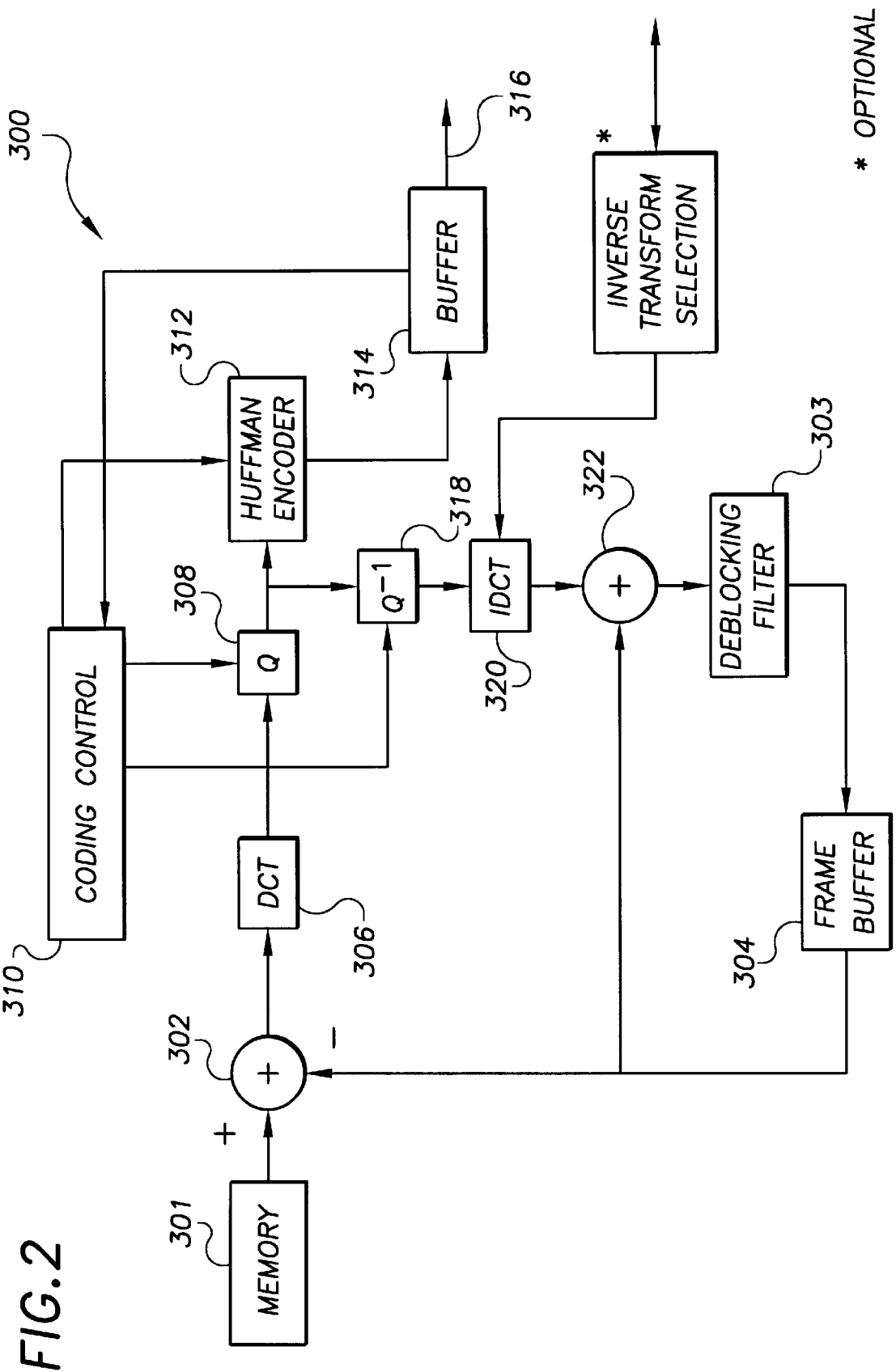
FIGS. 2, 2A and 2B illustrate in block diagram form various additional embodiments of an encoding arrangement according to the present invention.

FIG. 2 illustrates another embodiment of an encoding arrangement 300 that is particularly suited for use in the present invention. An original image is stored in a memory 301, such as a frame buffer. The original image is received by a summing element 302, which is configured and arranged to calculate difference information representing the difference between the original image and an image stored in a memory 304, such as a frame buffer. When no image is initially stored in the memory 304, the original image is passed to a transformation block 306, which transforms the image into coefficient data selected from a continuous range of values. In the illustrated example, the transformation block 306 performs a discrete cosine transform (DCT) on the original image. To encode a stream of images, the original image is replaced with successive frames after encoding each frame.

The coefficient data is further transformed by a transformation block, illustrated as a quantizer 308, which is controlled by a coding control block 310. The quantizer 308 maps the coefficient data to a discrete set of values by dividing the continuous range of values into a set of non-overlapping subranges. Each subrange is mapped to a single value, such that whenever a coefficient falls within a given subrange, the quantizer 308 generates the corresponding discrete value. The size of the subranges and the quality of the quantization are controlled by the coding control block 310.

The quantized data thus generated is encoded by an encoding block, illustrated as a Huffman encoder 312. For example, the quantized data may be encoded as a run length vector. The encoded data is stored in a memory 314 for transmission over a communications channel 316.

The quantized data is also received by a transformation block 318. The transformation block 318, implemented as an inverse quantizer in the illustrated example, maps the quantized data to a continuous range of values. The quality of the inverse quantization is controlled by the coding control block 310. A second transformation block 320 further transforms the quantized data using an inverse discrete cosine transform (IDCT) to reconstruct the image as it would be seen at a remote videoconferencing station.

Using a loop filter 303 to smooth out transitions at image block boundaries, the reconstructed image is incorporated into the image previously stored in the memory 304 by a summing element 322, and the image thus produced is stored in the memory 304 as the new reference frame for encoding the next frame. The memory 304 provides the reconstructed image to the summing element 302, and the process is repeated, either by continuing to encode successive frames of video, or by progressively improving a single still image.

Figure 2A:
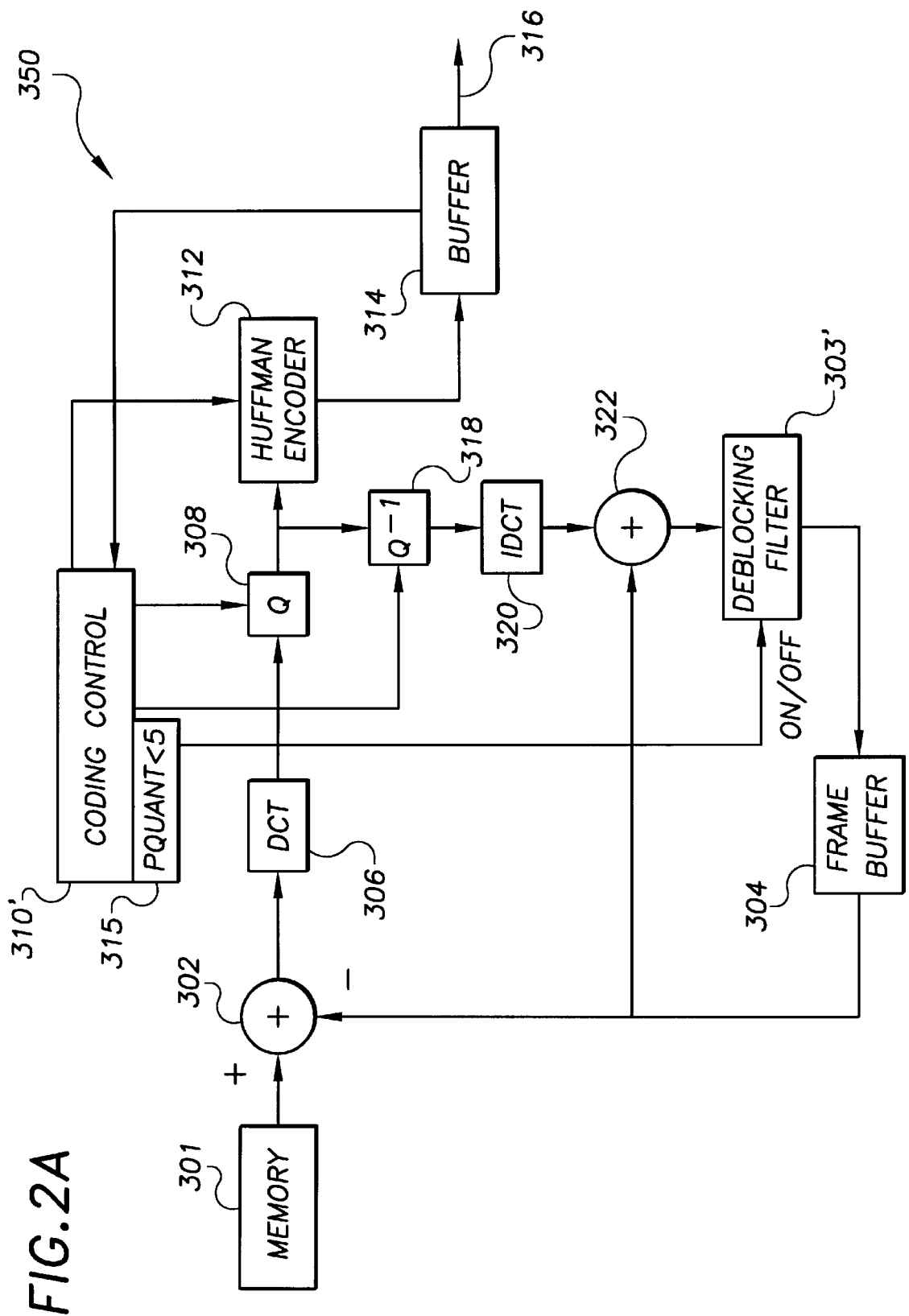

FIG. 2A illustrates another example embodiment of a decoding arrangement 350. The functional blocks illustrated in FIG. 2A correspond and perform as described in connection with the corresponding blocks of FIG. 2, with certain exceptions relating to the coding control block 310 of FIG. 2. In FIG. 2A, the coding control block 310' is used not only to control the quality of the quantization and inverse quantization as discussed in connection with FIG. 2, but also to determine when the characteristics of the incoming data merit use of the deblocking filter 303' of FIG. 2A. In accordance with the present invention, it has been discovered that divergence can be reduced by disabling the deblocking filter for those frames with picture or average quantizations that are less than a selected threshold.

Further, in connection with the present invention it has been discovered that the perceptual advantage provided by the deblocking filter is present only at higher quantizations. For example, the perceptual advantage provided by the deblocking filter is present when the quantization parameter (PQUANT) is at least five. Accordingly, in the example decoding arrangement 350 of FIG. 2A, the coding control block 310' is coupled to an enable/disable port of the deblocking filter 303'. The coding control block 310' uses a comparator block 315 to determine whether or not PQUANT is less than the selected threshold, "five" in this instance. The selected threshold is checked on a frame-by-frame basis (after encoding each frame) or, alternatively, using an average of a number of previously coded frames. In a particular embodiment, several previously coded frames are used to form the average. Using this data flow arrangement, the coding control block 310' monitors PQUANT and uses the average PQUANT value over some number of frames in order to compare with the threshold. This provides for less-frequent enable/disable transitions for the deblocking filter.

Any of the above-described embodiments of FIG. 2A is advantageous because each realizes a significant reduction in both divergence artifacts and computation.

Figure 2B:
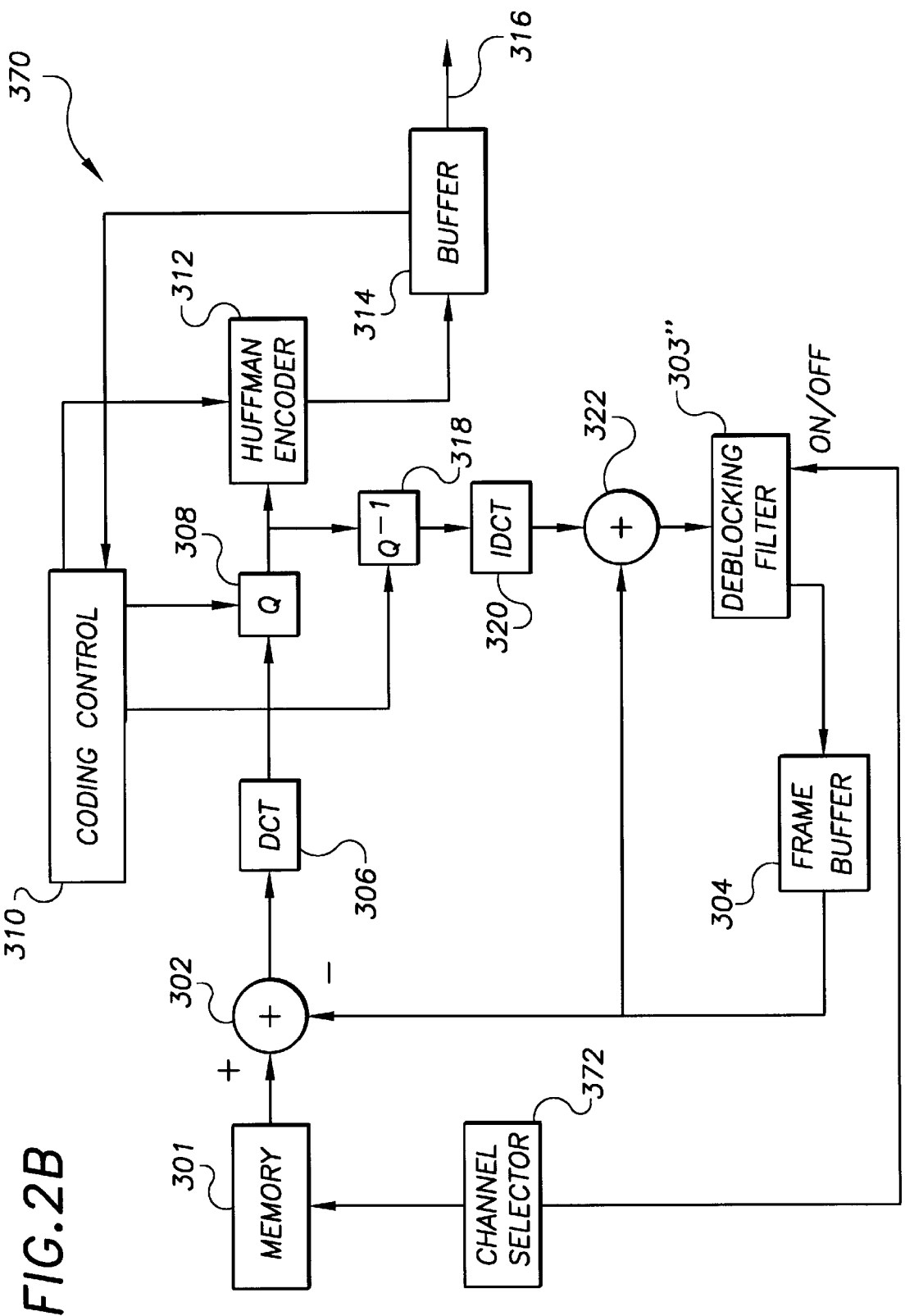

FIG. 2B illustrates yet another example embodiment of a decoding arrangement 370 in which a deblocking filter 303" includes an enable/disable port controlled by a channel selector 372. The channel selector 372 includes conventional channel selection addressing for sequentially selecting the luma channel and chroma channels for each frame in the memory 301. In addition, the channel selector 372 disables the deblocking filter 303" when the chroma channels of the memory 301 are selected for encoding. This implementation realizes an elimination of prominent divergence artifacts, including a lack of significant blockiness. Although luma-based divergence artifacts remain, such artifacts are much less severe than chroma-based artifacts.

Alternatively, the processing of the luma and chroma channels for each frame in the memory 301 is performed on a parallel-path basis (not shown), rather than the above-described sequential or alternating luma/chroma channel processing method. In this alternative implementation, a deblocking filter is used only for the portion of the encoding arrangement that encodes the luma channel data, and not for the portion of the encoding arrangement that encodes the chroma channel data.

According to other example embodiments of the present invention, two or more of the above criteria are used at the same time to minimize and/or remove divergence artifacts in the encoding arrangement. In one implementation, for example, the deblocking filter is disabled when PQUANT is less than the selected threshold and/or when chroma channel data is being encoded.

Figure 3:
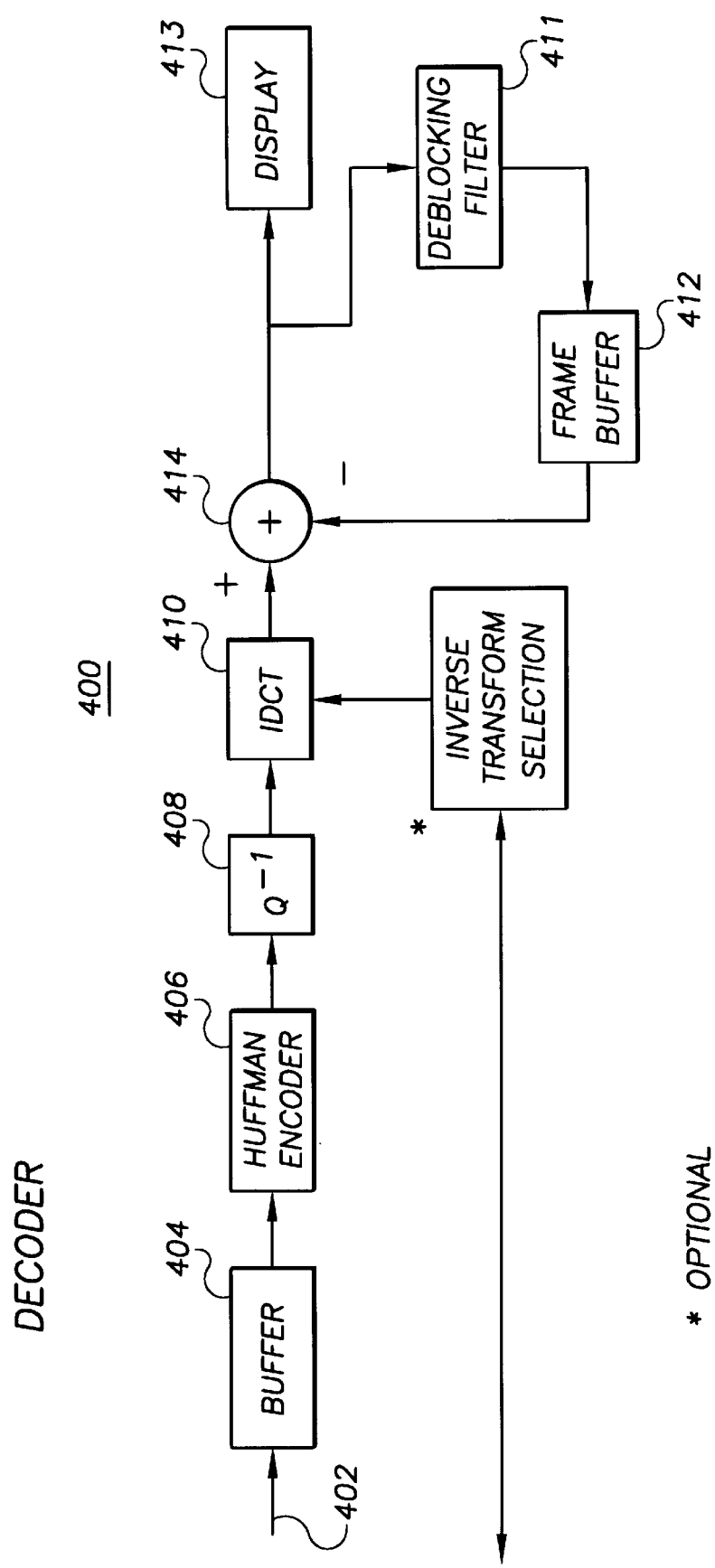
FIG. 3 illustrates in block diagram form an embodiment of a decoding arrangement, according to the present invention, that is useful for decoding images sourced from the encoding arrangement of FIG. 2 and generally consistent with other ones of the illustrated encoding/decoding methods and processes discussed below.

FIG. 3 illustrates another example embodiment of a decoding arrangement 400, also including a loop filter like the loop filter of FIG. 2, that is also particularly suited for use in the present invention. A data stream received over a communications channel 402 is stored in a memory 404, implemented as a buffer in the illustrated example. A decoder, illustrated as a Huffman decoder 406, decodes the data stream into image data and provides the image data to a transformation block 408. The transformation block 408, implemented as an inverse quantizer in the illustrated example, maps the image data to a continuous range of values. A second transformation block 410 further transforms the continuous value using an inverse discrete cosine transform (IDCT) to reconstruct the difference information received from the local terminal. A summing element 414 integrates the difference information into the image previously stored in a memory 412, depicted as a frame buffer, and the image is filtered by a loop filter 411 (constructed similar to the loop filter 303 of FIG. 2). The image thus produced is stored in the memory 412 and displayed by a display device 413. Additional data received over the communications channel 402 is integrated into the stored image to improve its quality.

It has been discovered in connection with the present invention that visually apparent divergence artifacts occurs and that the visual artifacts worsen over time when the ITU-T H.263 Annex J loop filter is used in the case where the encoder IDCT differs from the decoder IDCT. Differences between sending codec and receiving codec IDCTs may arise due to difference in how many bits of precision are used in the arithmetic operations of the specific implementation of the IDCT, even though both IDCTs are H.263 Annex A compliant. Furthermore, the artifacts do not occur if the loop filter is turned off. It is therefore likely that the loop filter may enhance the mismatch between encoder and decoder IDCT.

To reproduce these described divergence artifacts, reference may be made to document Q15-D-41 submitted to the ITU-T Study Group 16 (paper dated Apr. 13, 1998). These divergence artifacts were discovered using the following setup:

Encoder: UBC encoder tmn-3.1.2 using their floating point IDCT, with Annex J enabled. For simplicity, only enable loop filter with Annex J, and keep unrestricted motion vector mode and four motion vector modes OFF.
>tmn -i rawseq -B bs-q I-a 0 -b 99 -q 2 -A 2 -k 0 -1

Decoder: UBC decoder tmndec-3.1.2 using a modified fixed-point IDCT. The fixed-point IDCT was modified to make it H.263 Annex A compliant and is listed in Appendix A.
>tmndec -o4 -x -1 bs-q I -j Test sequence: A one hundred frame natural sequence showing a stationary color grid is included in a file entitled "rawseq" as discussed in the above-referenced paper submitted to the ITU-T.

The above simulations were used on the included dataset for QP values ranging from 1 to 31. Included in q15d4lab.tar.gz are coded bitstreams where Annex J is both on and off (bs-ql-j, bs-ql), with QP=1.

For low QPs (0<QP<5), obvious divergence patterns appear along edges. For QP=1 (bs-ql-j) a vertical line along the right edge of the yellow patch, as well as spots along the 8×8 block boundaries in the lower right blue patch appear. When QP is increased, the patterns become blurred, but divergence patterns are still noticeable along the edges of the green center-low patch and the blue right-low patch up to QP=4.

Note that the INTRA MB refresh rule (threshold=132 coded MBs) does not prevent artifacts with the test sequence since the threshold is not reached. In general, even if the threshold is reached, divergence may have already leaked into other MBs under the following conditions: (1) uncoded blocks that border coded blocks are filtered based on the pixels in the coded blocks; these uncoded blocks are not fixed by the refresh since their threshold are never triggered; and (2) MVs of neighboring MBs may reference areas of divergence, the neighboring MBs are not fixed by the refresh if they stop referencing the refreshed MB.

Condition (1) is specific to the loop filter and gives rise to an interesting scenario. Refreshing a MB may not even fix divergence within the refreshed MB since the loop filter may immediately pull in divergence errors just outside the MB boundaries.

The observed visual artifacts indicate that the loop filter is not stable in a control sense; i.e., a small difference in the encoder/decoder is amplified by the filter. This amplification is demonstrated for a specific range of the filter in the following example.

The deblock equations are:

$Bi=clip(B+di)$ $Ci=clip(C-di)$ $Ai=A-d2$ $Di=D+d2$ $d=(A-4B+4C-D)/g$ $di=UpDownRamp(d, STRENGTH)$ $d2=clipd\ I((A-D)/4,\ d\ \frac{1}{2})$ Consider the case where A=D, and for simplicity no clipping is required. Then the equations are:

$Bi=B+di$ $Ci=C-di$ $Ai=A$ $Di=D$ $d=(C-B)/2$ $di=UpDownRainp((C-B)/2, STRENGTH)$ $d2=0$ Note that only B and C get updated by the deblock filter. Assume the encoder has $C'-B'>0$ and the decoder has $C''-B''>0$ and that there is a slight encoder/decoder IDCT mismatch such that $$\frac{(C''-B'')-(C'-B')}{2d''\ \ \ \ \ \ 2d'} = A > 0$$

If these (d', d'') are in the negative slope range of the UpDownRamp, then di'>di'. Now since $Cl'-Bl'=(C'-B')-2dl'$ $Cl''-BI''=(C''-B'')-2dl''$ the encoder/decoder mismatch after the deblock filter will be:

$AI(Cl''-BI'')-(Cl'-BI')$ $(C''-B'')-(C'-B')-2di''+2dl'A+2(dl'-di'')$

The quantity (dI'−dI'') is positive and therefore $Al>A$ which implies that the filter amplifies the encoder/decoder mismatch.

The present invention addresses this discovered problem using one or more of the embodiments that are discussed below.

According to one implementation, the present invention provides a method for encoding and decoding involving the use of an inverse transform that is specified bit-exactly in encoder and decoder. For example, the encoding/decoding arrangement of FIGS. 2 and 3 provide this approach, using a specified bit-exact match. This avoids encoder/decoder inverse transform mismatch, thereby eliminating divergence artifacts.

According to another implementation, the present invention provides a method for encoding and decoding involving the use of an inverse transform that is specified bit-exactly in encoder and decoder, as described above, but the inverse transform is selected at the run-time from a set of available inverse transforms. The comunicating terminals then negotiate to reach a common inverse transform so that encoder/decoder inverse transforms are matched, thereby eliminating divergence artifacts. FIGS. 2 and 3 illustrate an alternative encoding/decoding arrangement, according to the present invention, using an optional inverse transform selector at each end to provide the appropriate matching.

Figure 4:
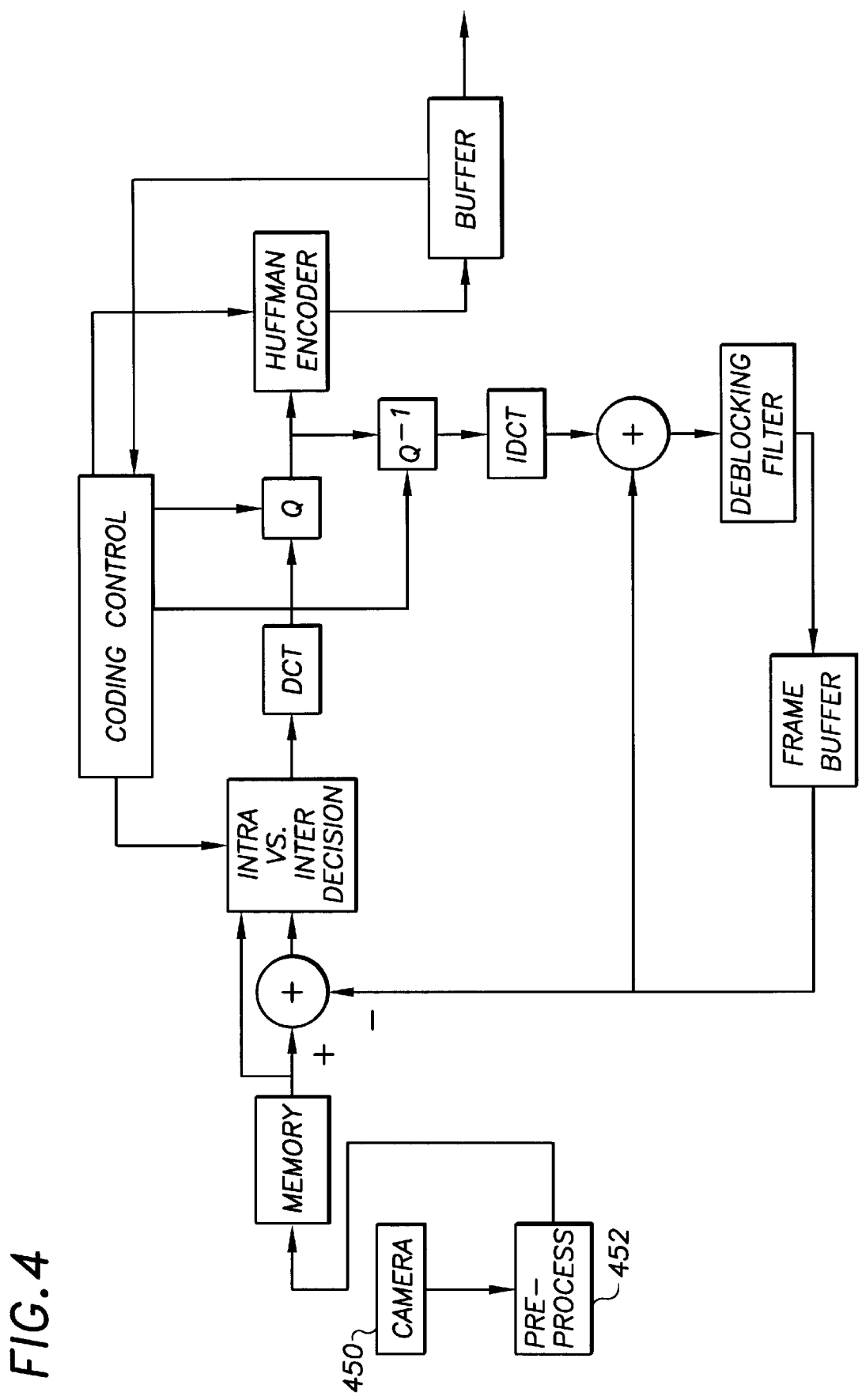
FIG. 4 illustrates in block diagram form another embodiment of an encoding arrangement according to the present invention.

According to another implementation, the present invention provides a method for encoding and decoding involving the step of pre-processing image data before encoding in the loop. For example, by applying a filter to the entire image, or selectively in regions that may give rise to divergence artifacts, any potential inverse transform mismatch from being significantly enhanced by the loop filter is prevented to reduce divergence artifacts. Such an implementation is shown in FIG. 4, where the input data supplied by the camera 450 is filtered at filter 452 before presentation to the encoder 454 to avoid divergence build-up.

Figure 5:
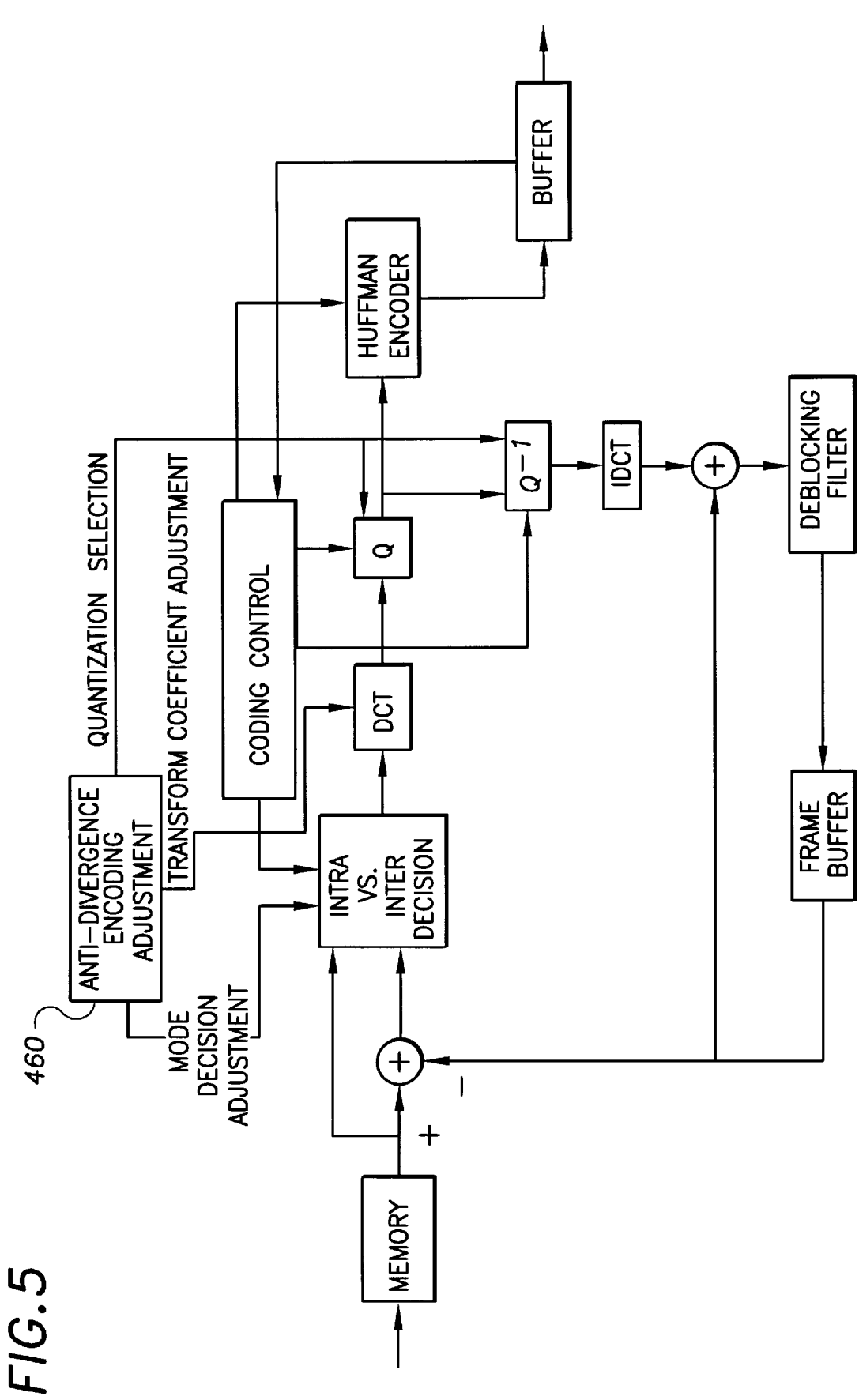
FIG. 5 illustrates in block diagram form another embodiment of an encoding arrangement according to the present invention.

According to another implementation, the present invention provides a method for encoding and decoding involving the use of a modified encoding arrangement to reduce errors. Example implementations include one or more of the following: an encoding arrangement that selects a quantization value which is less prone to divergence; an encoding arrangement that adjusts transform coefficients to limit divergence; an encoding arrangement that adjusts the encoding mode decision for macroblocks; and an encoding arrangement that uses combinations of the above approaches. Such an implementation is shown in FIG. 5, where an anti-divergence encoding adjustment block 460 is used to provide one or more of these adjustments or selections.

Figure 6:
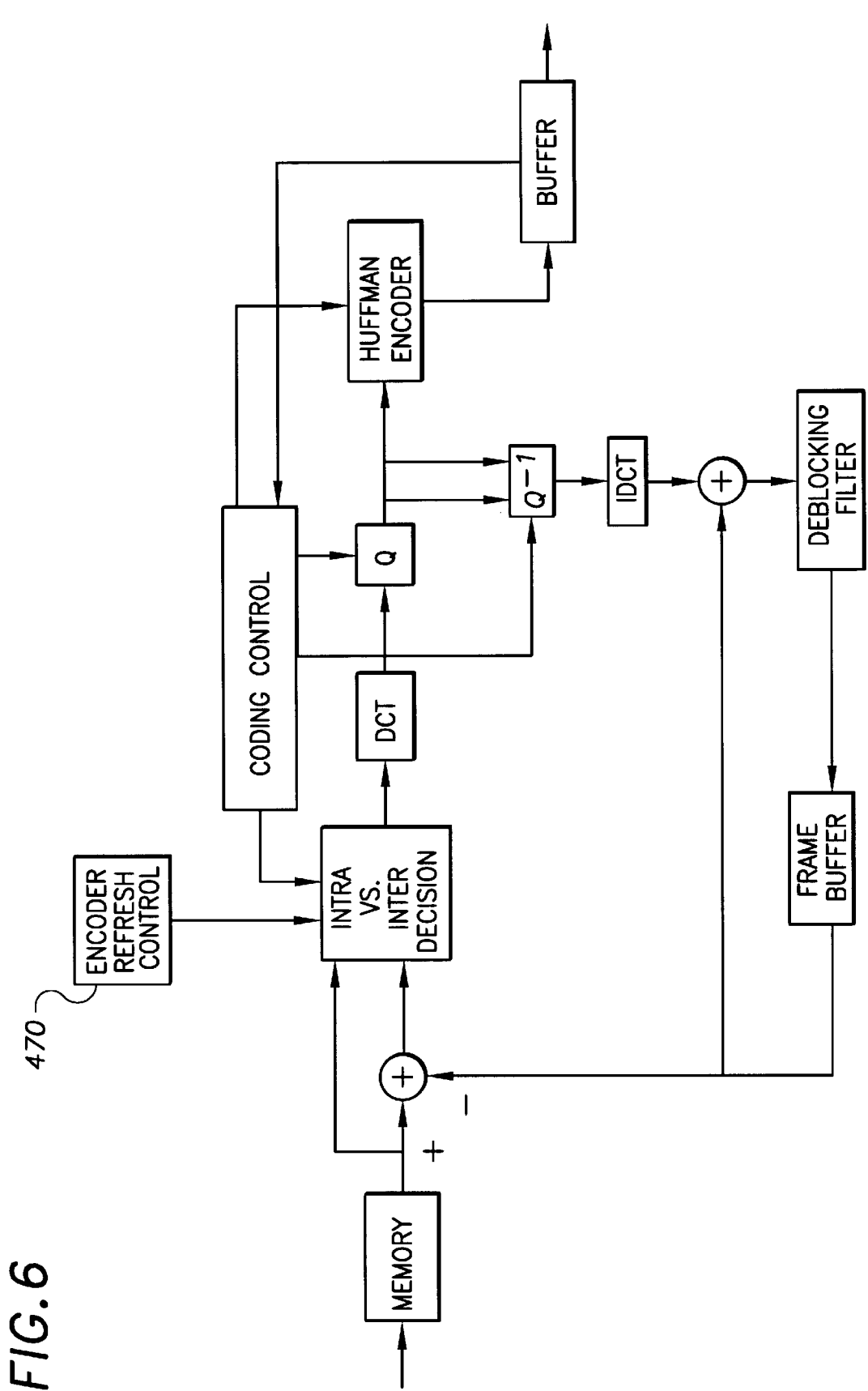
FIG. 6 illustrates in block diagram form another embodiment of an encoding arrangement according to the present invention.

As shown by way of example in the encoding arrangement of FIG. 6, another embodiment of the present invention involves the encoding arrangement determining at block 470 which portions of the image are diverging. The portions are INTRA coded (refreshed) to terminate any divergence. The refresh is accomplished by coding the regions in INTRA mode, with no dependencies on previous reference data.

Figures 2, 7:
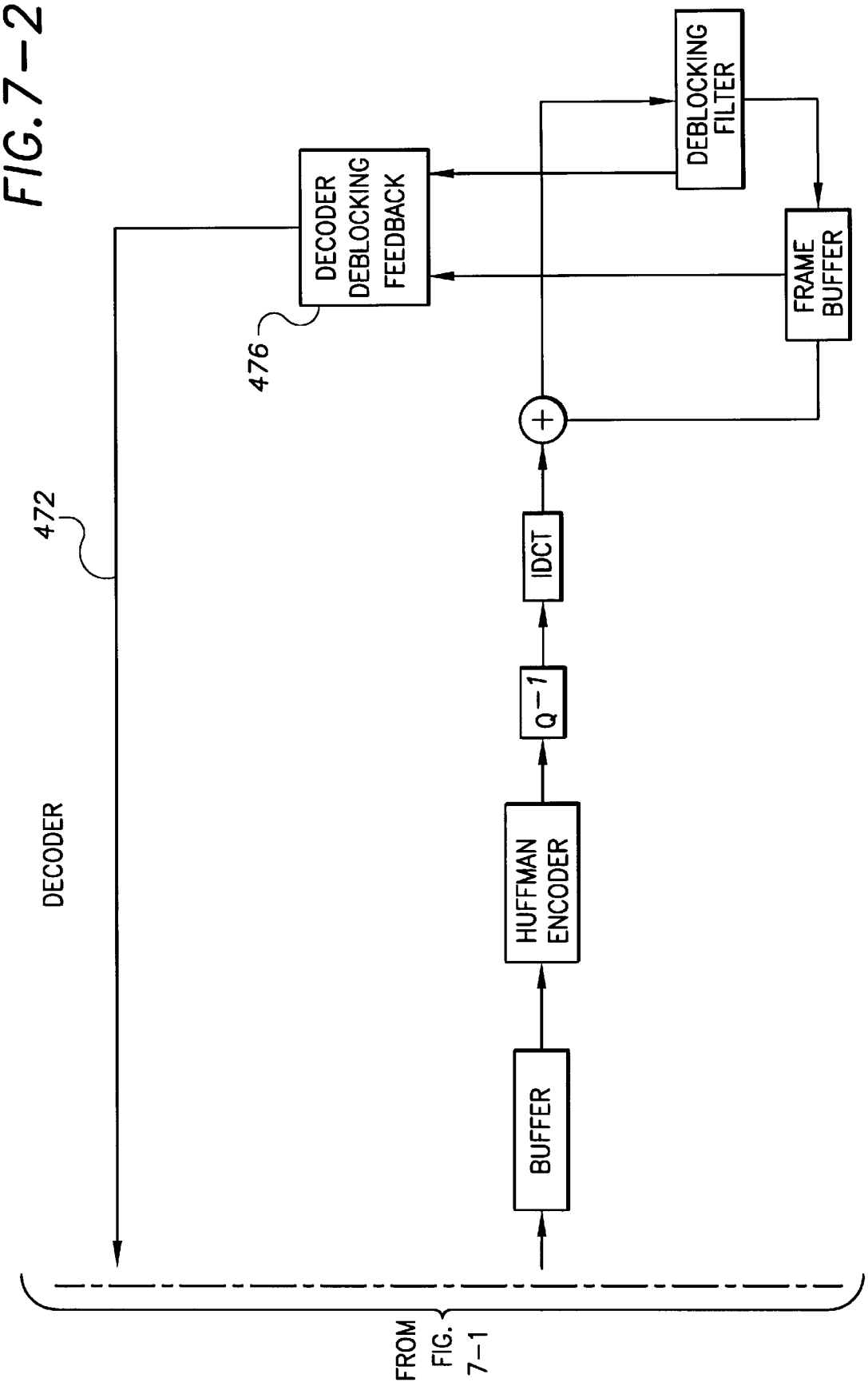
FIG. 7 illustrates in block diagram form another embodiment of an encoding/decoding arrangement according to the present invention.

In yet another embodiment of the present invention and as shown by way of example in FIG. 7, a conventional encoding arrangement is modified as above to refresh portions of the image that are diverging and coding the regions in INTRA mode, but based on information conveyed from the decoder via a feedback channel, such as a channel 472 carrying control data between encoder refresh controller 474 and decoder deblocking feedback controller 476. The information may include, for example, copies of the decoder's reference frame at a particular time, or portions thereof. This similarly terminates divergence artifacts before they become significant.

Figure 8A:
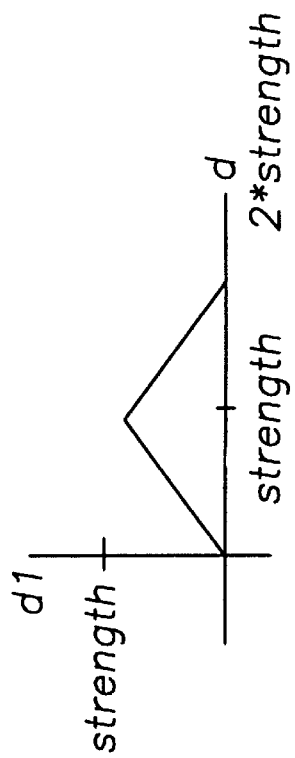
FIGS. 8A and 8B illustrate in graphic form characteristics of respective transform loops according to particular embodiments of the present invention.
Figure 8B:
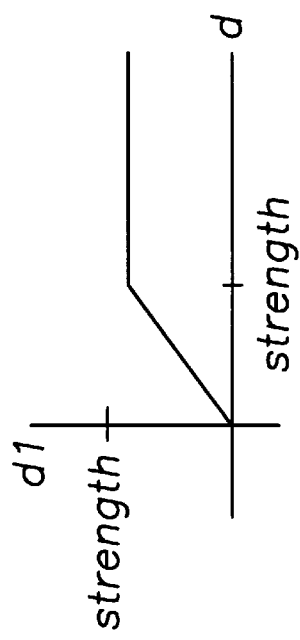

According to another implementation and as shown by way of example in FIGS. 8A and 8B, the modified set of loop filter characteristics shown in FIG. 8B are used rather than the ITU-T set of FIG. 8A so that inverse transform mismatches are not amplified. One or more of the loop filter equations, the strength table, and the definition of the UpDownRamp curve, are adjusted to reduce loop filter amplification of inverse transform mismatch.

In another embodiment, the encoding arrangement is adaptively modified depending on the motion in the scene. A more particular embodiment involves such adaptive modification applied non-uniformly to luma and chroma components of the image data. In an alternative particular embodiment, such adaptive modification is applied uniformly to luma and chroma components of the image data.

Using either of these particular implementations, the adjustments to the encoder behavior reduce divergence artifacts.

Figures 1, 9:
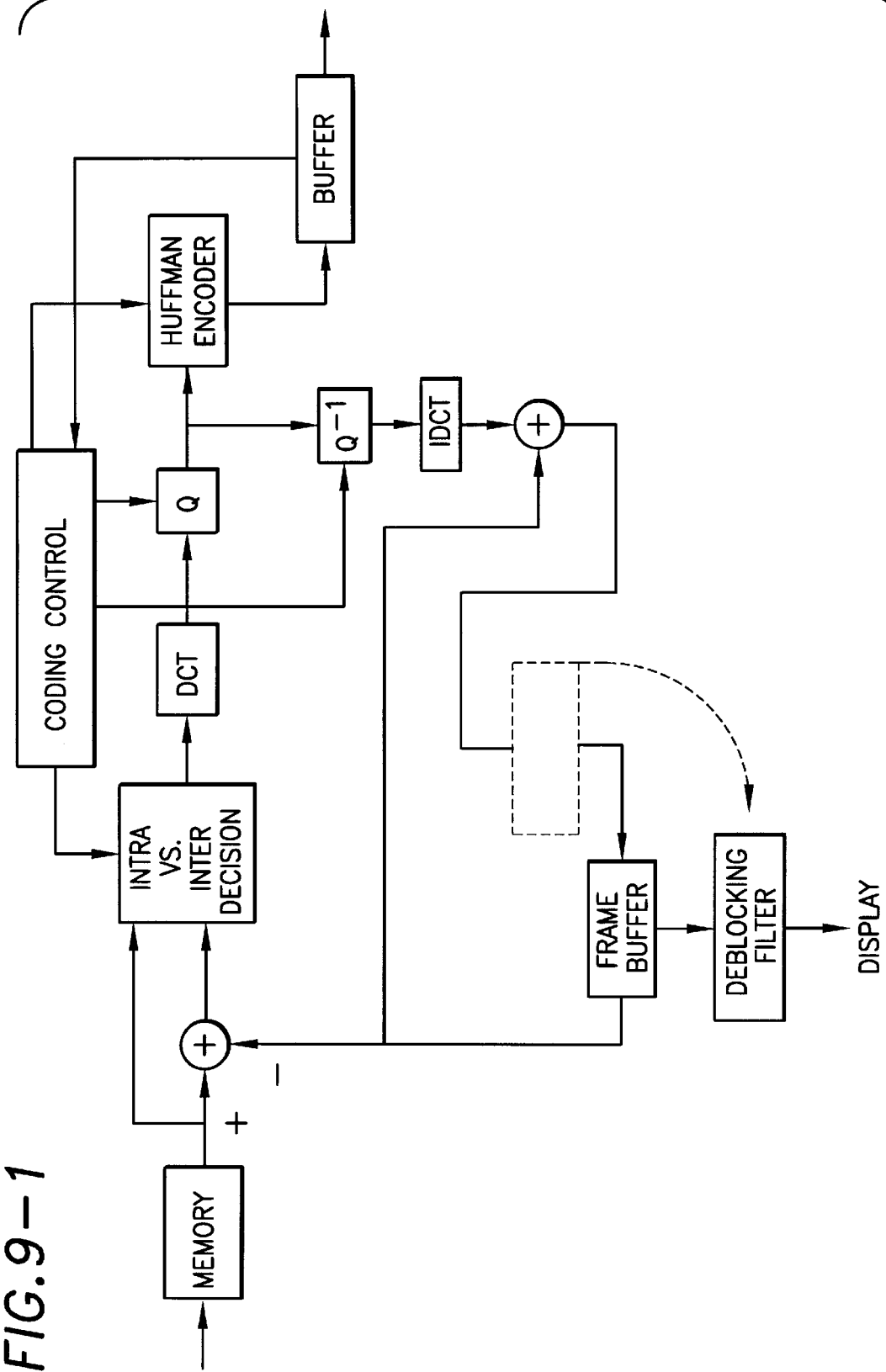
FIG. 9 illustrates in block diagram form another embodiment of an encoding/decoding arrangement according to the present invention.
Figures 2, 9:
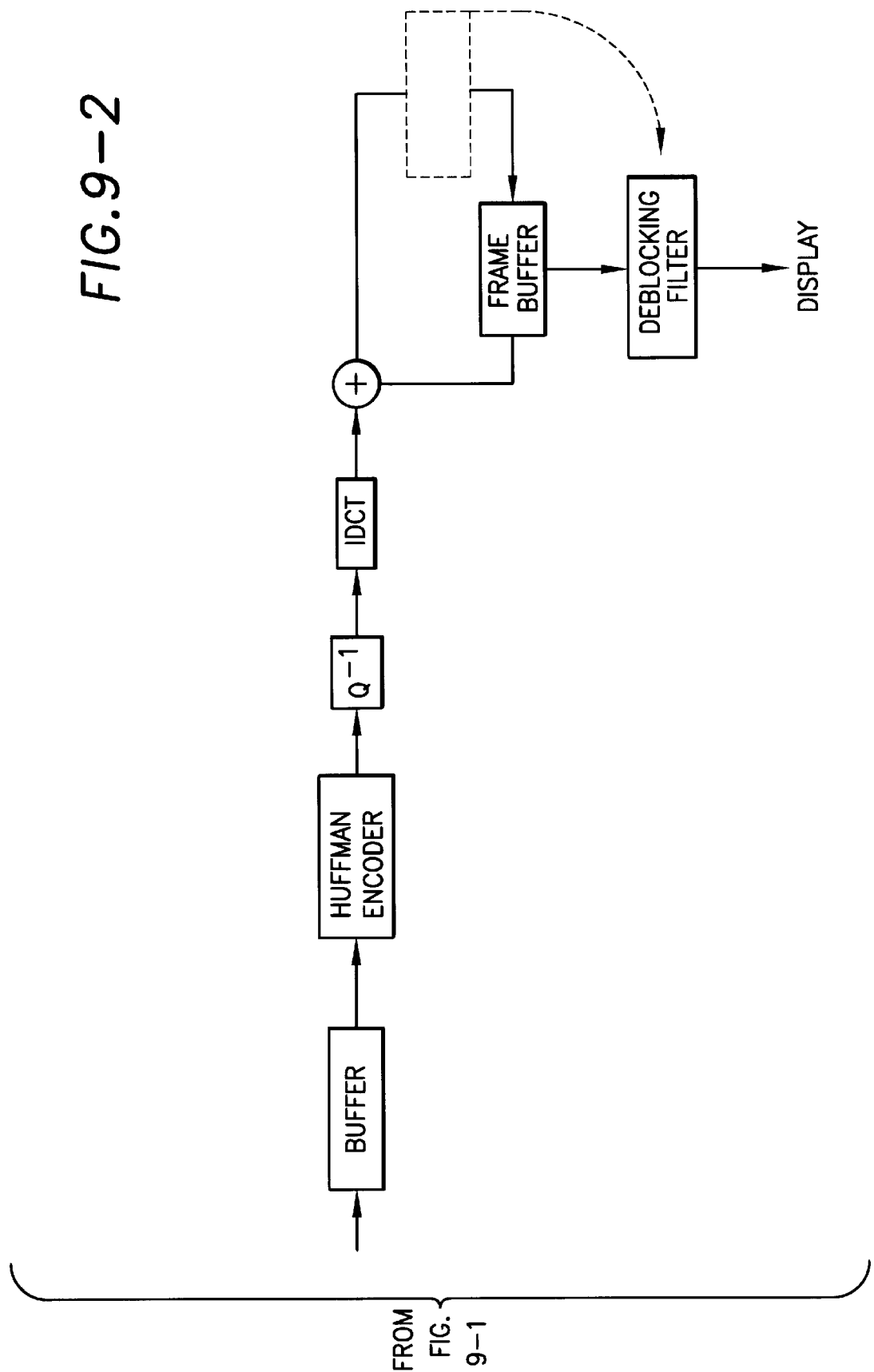

According to yet another implementation implementation and as shown by way of example in FIG. 9, the loop filter is applied to the frame buffer image just before sending the data to a display circuit, but the results are not written back to the frame buffer. This moves the loop filter out of the codec loop and preserves some of the benefits of deblocking, but any deblocking amplification of inverse transform mismatch is not fed back to avoid error build up and to eliminate divergence artifacts.

Accordingly, the present invention provides various implementations that solve a significant problem discovered in connection herewith. According to particular implementations, an encoding/decoding method and arrangement uses an inverse transform loop having a decoding algorithm that: is susceptible to accumulating error due to inverse transformer mismatch with the method and arrangement providing control to maintain the accumulation below an acceptable threshold; and/or eliminates the possibility of such an error being accumulated within the loop.

For further information concerning the construction and operation of the encoding and decoding components and blocks illustrated in connection with the figures, reference may be made to U.S. patent application Ser. No. 08/944,311, filed Oct. 6, 1997, and No. 09/005,053, filed Jan. 9, 1998 (Docket Nos. 11611.14USI1, and 11611.51US01), incorporated by reference in their entirety.

The various embodiments described above are provided by way of illustration only and should not be construed to limit the invention. Those skilled in the art will readily recognize various modifications and changes which may be made to the present invention. For example, various ones of the above approaches to eliminating or reducing artifacts are compatible and can therefore be combined. Such modifications may not strictly follow the above discussion of the exemplary embodiments and applications. However, these modifications do not depart from the teaching, or the true spirit and scope, of the present invention. The invention is set forth in the following claims.

What is claimed is:

1. A method for transmitting a representation of an image from a first terminal to a second terminal using a communications channel, comprising:

operating each of the first and second terminals using an inverse transformer loop having a decoding algorithm that accumulates at least one error; and selectively using a loop filter in the inverse transformer loop based on at least one predetermined condition.

2. A method, according to claim 1, wherein said at least one predetermined condition includes at least one of: surpassing a quantization parameter threshold; and processing chroma channel data.

3. A method, according to claim 1, wherein said at least one predetermined condition includes a quantization parameter threshold approximately equal to 5.

4. A method, according to claim 3, wherein said quantization parameter threshold being equal to 5 corresponds to an average of several quantization parameters.

5. A method, according to claim 1, further including refreshing.

6. A method for encoding and decoding a representation of an image for communication between a first terminal and a second terminal, comprising:

operating each of the first and second terminals using an inverse transformer loop; and preventing unacceptable accumulation of an error within the inverse transformer loop by at least one of: pre-processing input data before using the inverse transformer loop to process the input data; using the inverse transformer in the loop according to a bit-exact specification between the encoder and decoder in the respective first and second terminals; using the inverse transformer in the loop according to one of a plurality of bit-exact specifications between the encoder and decoder in the respective first and second terminals and negotiating a common decision on the particular specification through encoder/decoder negotiation; providing a quantization value in the inverse transformer loop that is less prone to divergence; adjusting or providing transform coefficients to limit divergence; choosing an encoding mode for macro-blocks of input data; modifying the encoder to refresh portions of the image that are diverging; modifying the loop filter characteristics so that inverse transform mismatches are not amplified; applying the loop filter to input data corresponding to a frame buffer image just before sending to a display circuit without writing back the results to a frame buffer in the loop; selectively using a loop filter in each inverse transformer loop based on at least one predetermined condition.

7. A method, according to claim 6, wherein said at least one predetermined condition includes at least one of: surpassing a quantization parameter threshold, and processing chroma channel data.

8. An image communication terminal having a circuit constructed and arranged to operate according to claim 6.

9. An image communication terminal having a circuit constructed and arranged to operate according to claim 1.

10. An image communication terminal having a circuit constructed and arranged to operate according to claim 2.

11. An image communication terminal having a circuit constructed and arranged to operate according to claim 3.

12. For communicating a representation of an image between a first terminal and a second terminal using a communications channel, an arrangement in at least one of the terminals, comprising:

means for operating the terminal using an inverse transformer loop having a decoding algorithm that accumulates at least one error; and means for selectively using a loop filter in each inverse transformer loop based on at least one predetermined condition.

13. For communicating a representation of an image between a first terminal and a second terminal using a communications channel, an arrangement in at least one of the terminals, comprising:

means for operating the terminal using an inverse transformer loop; and means for preventing unacceptable accumulation of an error within the inverse transformer loop by at least one of: pre-processing input data before using the inverse transformer loop to process the input data; using the inverse transformer in the loop according to a bit-exact specification between the encoder and decoder in the respective first and second terminals; using the inverse transformer in the loop according to one of a plurality of bit-exact specifications between the encoder and decoder in the respective first and second terminals and negotiating a common decision on the particular specification through encoder/decoder negotiation; providing a quantization valuer in the inverse transformer loop that is less prone to divergence; adjusting or providing transform coefficients to limit divergence; choosing an encoding mode for macro-blocks of input data; modifying the encoder to refresh portions of the image that are diverging; modifying the loop filter characteristics so that inverse transform mismatches are not amplified; applying the loop filter to input data corresponding to a frame buffer image just before sending to a display circuit without writing back the results to a frame buffer in the loop; selectively using a loop filter in each inverse transformer loop based on at least one predetermined condition.

* * * * *

UNITED STATES PATENT AND TRADEMARK OFFICE
CERTIFICATE OF CORRECTION

PATENT NO. : 6,160,503
DATED : December 12, 2000
INVENTOR(S) : Andrews et al.

It is certified that error appears in the above-identified patent and that said Letters Patent is hereby corrected as shown below:

Column 1,
Lines 9-11, delete "U.S. patent application Ser. No. 09/098,106, filed Jun. 16, 1998, which is a continuation of".
Line 12, after "filed Jan. 9, 1998," insert -- (now U.S. Pat. No. 6,124,882) --.

Column 2,
Line 9, after "terminals in" insert -- an --.
Line 15, replace "manufacturers" with -- manufactures --.

Column 7,
Line 45, replace "threshold" with -- thresholds --.
Line 50, after "Refreshing" replace "a" with -- an --.

Column 8,
Line 15, replace "dI-UpDownRainp" with -- dI-UpDownRamp --.

Signed and Sealed this

Sixteenth Day of October, 2001

Attest:

NICHOLAS P. GODICI
*Attesting Officer*   *Acting Director of the United States Patent and Trademark Office*